(12) United States Patent
Barry et al.

(10) Patent No.: US 7,085,791 B2
(45) Date of Patent: Aug. 1, 2006

(54) METHOD AND APPARATUS FOR GENERATING A PSEUDO RANDOM NUMBER

(75) Inventors: Mark Patrick Barry, Sydney (AU); Mark Andrew Bickerstaff, Carlingford (AU)

(73) Assignee: Lucent Technologies Inc., Murray Hill, NJ (US)

(*) Notice: Subject to any disclaimer, the term of this patent is extended or adjusted under 35 U.S.C. 154(b) by 645 days.

(21) Appl. No.: 10/366,383

(22) Filed: Feb. 14, 2003

(65) Prior Publication Data

US 2004/0162863 A1 Aug. 19, 2004

(51) Int. Cl.
 *G06F 1/02* (2006.01)

(52) U.S. Cl. ..................................................... 708/250

(58) Field of Classification Search ......... 708/250–256
 See application file for complete search history.

(56) References Cited

U.S. PATENT DOCUMENTS 5,999,953 A * 12/1999 Monier ....................... 708/250
6,014,446 A * 1/2000 Finkelstein .................. 380/46
6,285,761 B1 * 9/2001 Patel et al. ................... 380/44

OTHER PUBLICATIONS

Sivakumar, R. et al. "VLSI Architectures for Computing X mod M," *IEEE Proceedings on Circuits, Devices and Systems*, vol. 142, No. 5, Oct. 1995, pp. 313-320.

Heergard, C. et al. "Turbo Coding." Kluwer Academic Publishers, 1999, pp. 35-63.

Berrou, Claude et al. "Near Optimum Error Correcting Coding and Decoding: Turbo-Codes." *IEEE Transactions on Communications*, vol. 40, No. 10, Oct. 1996, pp. 1261-1271.

Wu, Z. "Coding and Iterative Detection for Magnetic Recording Channels." Kluwer Academic Publishers, 1999, pp. 44-45.

Erfanian, Javan et al. "Reduced Complexity Symbol Detectors with Parallel Structures for ISI Channels." *IEEE Transaction on Communications*. vol. 42, Feb./Mar./Apr. 1994, pp. 1661-1671.

Summers, Todd et al. "SNR Mismatch and Online Estimation in Turbo Decoding." *IEEE Transactions on Communications*. vol. 41, 1998, pp. 421-423.

Pietrobon, Steven S. "Implementation and Performance Of A Turbo/Map Decoder." *International Journal of Satellite Communications*, 16, 1998, pp. 23-46.

Robertson, Patrick et al. "Optimal and Sub-Optimal Maximum a Posteriori Algorithms Suitable for Turbo Decoding." International Conference on Communications, 1995. pp. 1009-1013.

Bahl, L.R. et al. "Optimal Decoding of Linear Codes for Minimizing Symbol Error Rate." *IEEE Trans. Inform. Theory*, vol. IT-20, Mar. 1974, pp. 284-287.

Robertson, Patrick et al., "A Comparison of Optimal and Sub-Optimal MAP Decoding Algorithms Operating in the Log Domain." IEEE 1995, pp. 1009-1013.

Worm, Alexander. "Turbo-Decoding Without SNR Estimation." IEEE Communications Letter, vol. 4, No. 6, Jun. 2000, pp. 193-195.

* cited by examiner

Primary Examiner—D. H. Malzahn

(57) ABSTRACT

In the method of generating a pseudo random number, pseudo random numbers equal to pseudo random numbers generated from a pseudo random number generation function indexed by orders of two are stored. Then, a pseudo random number is generated based on the stored pseudo random numbers.

20 Claims, 3 Drawing Sheets

METHOD AND APPARATUS FOR GENERATING A PSEUDO RANDOM NUMBER

BACKGROUND OF THE INVENTION

1. Field of the Invention

The present invention relates to any field such as cryptography and coding where pseudo random numbers are used.

2. Description of Related Art

In many communication and cryptography algorithms, pseudo-random numbers are generated using modular arithmetic. The pseudo-random number $S(i)$ of index 'i' is generated using the formula, (1), below.

$$S(i) = v^i \bmod p \quad (1)$$

where p is a modulus greater than or equal to 3. In generation of Galois fields, p is often a prime number, and in other algorithms p is often the product of 2 relatively prime numbers.

The value v is usually the prime root of the prime p in the application of Galois field generation. In many cryptographic applications it is the plaintext to be encrypted or other function to be randomized using the index 'i'.

Random number generation can also be done in an iterative manner using the equivalent formula, (2), below.

$$S(i) = [v*S(i-1)] \bmod p \quad (2)$$

However sometimes the index usage of 'i' is not sequential and it is not possible to use the iterative method. In this situation, all of the possibilities for $S(i)$ need to be stored in a RAM by calculating them iteratively for a particular p, and a particular pseudo random number $S(i)$ is then selected from the RAM as needed using an index.

In certain applications it is desired to reduce the overhead associated with pre-calculating all the $S(i)$ values every time p changes. For example if p were changing frequently, then the overhead of calculating all of the possible $S(i)$ would be enormous. This leaves the choice of storing all of the possible $S(i)$ for all possible p in a RAM which could be enormous, or calculating $S(i)$ on-the-fly using formula (1) above. The challenge with calculating $S(i)$ on the fly is that to implement equation (1) directly in hardware could lead to enormous bit widths for certain applications making it infeasible to calculate on the fly.

SUMMARY OF THE INVENTION

The invention discloses a binary reduction method for calculating $S(i)$ on-the-fly with much reduced startup overhead that is suitable for hardware implementation. The invention also shows how complexity can be traded-off with the number of cycles needed for the calculation, thus making it suitable for a large range of applications.

According to one exemplary embodiment of the present invention, a pseudo random number is generated based on the set of stored pseudo random numbers, wherein the stored pseudo random numbers correspond with pseudo random numbers generated from a pseudo random number generation function indexed by orders of two. In one exemplary embodiment, the set of stored pseudo random numbers includes N pseudo random numbers stored in memory. Each of the stored N pseudo random numbers equals a pseudo random number generated from a pseudo random number generation function $S(i)$, where i is the index of the pseudo random number generation function, and the stored N pseudo random numbers equal pseudo random numbers generated using indices $i=2^n$, where $n=0 \ldots N-1$. Furthermore, in an exemplary embodiment of the present invention, the pseudo random number generation function $S(i)$ equals $v^i \bmod p$, where v is a number less than p.

The method and apparatus according to the present invention also provide an efficient technique for storing the set of pseudo random numbers in a memory. In one exemplary embodiment, this technique involves storing a first pseudo random number correspond with a pseudo random number generated from a pseudo random number generation function indexed by the first number. Then pseudo random numbers corresponding with pseudo random numbers generated using the pseudo random number generation function indexed by orders of the first number based on the stored first pseudo random number are generated and stored.

In exemplary embodiments of the pseudo random number generation methodology and the storing methodology according to the present invention, a mod operation is performed. In an exemplary embodiment of the present invention, this mod operation is performed by selectively combining $2^i \bmod p$ values for $i=0$ to $x-1$, where x is greater than one.

In one embodiment, the mod computation device includes a memory storing the $2^i \bmod p$ values. This memory is efficiently populated in one exemplary embodiment determining the $2^n \bmod p$ value based on the $2^{n-1} \bmod p$ value, where n is greater than 1.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EMBODIMENTS

The pseudo random number generation methodology according to the present invention will first be described followed by an exemplary hardware architecture for implementing the method according to the present invention. Next, a methodology for populating a memory used in the pseudo random number generation methodology according the present invention will be described followed by an exemplary hardware architecture for implementing this methodology. Then, an exemplary embodiment of a mod unit for use in the architectures according to the present invention will be described followed by an exemplary hardware architecture according to the present invention for populating a memory in the mod unit.

Generating Pseudo Random Numbers

The pseudo random number S(i) can be reformulated into a non-recursive equation as seen in equation (3) below, which decomposes S(i) into a product of the binary components with a mod operation applied to each of the components.

$$S(i) = v^i \bmod p = \left[\prod_{j=0}^{x-1} \left(v^{b_j 2^j} \bmod p\right)\right] \bmod p \quad (3)$$

$$\text{where } i = \sum_{j=0}^{x-1} b_j 2^j, \ x = \text{ceiling}(\log_2 p)$$

Hence, any S(i) can be formed by multiplying a combination of S(1), S(2), . . . , S($2^n$) and taking the mod p of the result.

Example for S(i) Generation

Next, an exemplary hardware architecture for implementing the pseudo random number generation methodology of the present invention will be described with respect to FIG. 1. This example assumes a value of p that does not exceed 256, but it will be appreciated that p is not limited to being less than, greater than or equal to 256.

Figure 1:
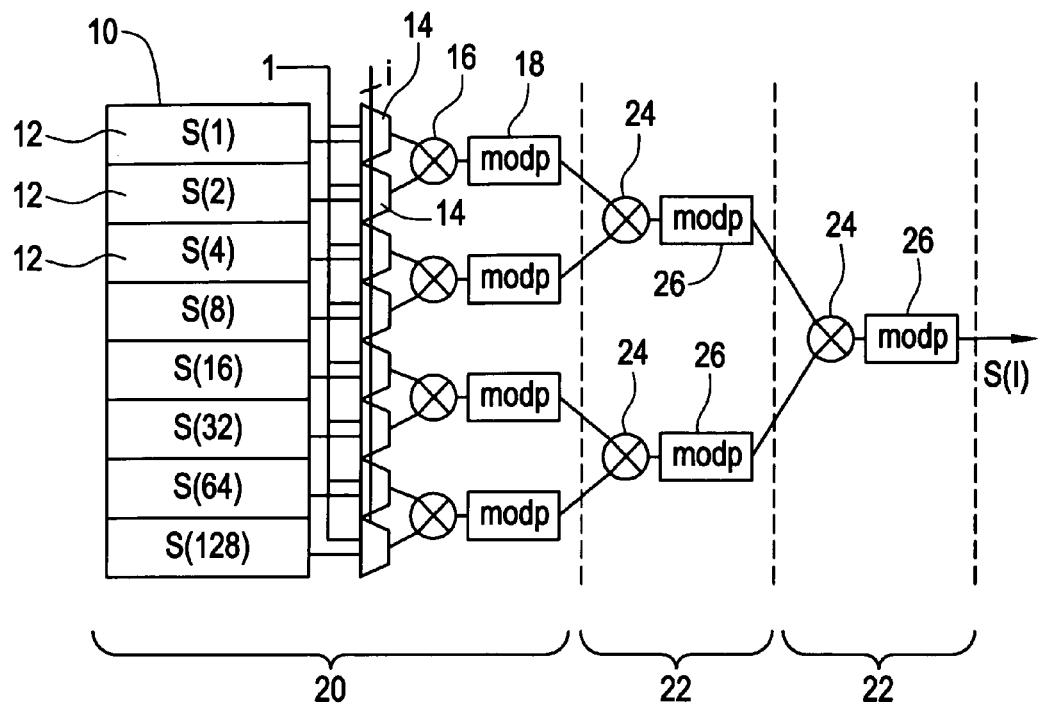
FIG. 1 illustrates a hardware architecture for generating a random number according to an embodiment of the present invention.

As shown in FIG. 1, a memory 10 stores the pseudo random numbers equal to S(1), S(2), S(4), . . . , S($2^n$) in a respective memory location 12, where $2^n <= p < 2^{n+1}$. In this example, because p does not exceed 256, n is 7. A multiplexer 14 is associated with each memory location 12, and receives the value stored in the associated memory location 12 and a value of 1 at first and second inputs. The multiplexer 14 serves as a selector and selectively outputs either the value stored in the memory location 12 or the value 1. The multiplexers 14 make their selection based on the index value i for generating the pseudo random number. Specifically, the index value i is in binary and is n+1 bits long. Each bit forming the binary value i controls a respective one of the multiplexers 14. The least significant bit of the index value i controls the multiplexer 14 associated with the memory location 12 storing S(1), the next most significant bit of the index value i controls the multiplexer 14 associated with the memory location 12 storing S(2), etc.

A multiplier 16 is associated with each pair of multiplexers 14 as shown in FIG. 1, the multiplier 16 multiplies the outputs from the multiplexers 14. A mod unit 18 is associated with each multiplier 16 and generates the mod p of the output from the associated multiplier 16. The memory 10, the multiplexers 14, the multipliers 16 and the mod units 18 form a first operational stage 20 of the exemplary hardware architecture for implementing the pseudo random number generation methodology of the present invention. After the first operational stage 20, a number of second operational stages 22 follow. Each second operational stage 22 includes a multiplier 24 receiving the output of a pair of mod units 18 or 26 in the previous operational stage. The second operation stage 22 also includes a mod unit 26 associated with each multiplier 24 for generating the mod p of the output from the associated multiplier 24.

The number of second operational stages 22 depends on the size of p, and may be a number such that the final second operational stage 22 generates a single mod unit 26 output. The output from this final mod unit 26 is the pseudo random number.

While an even number of memory locations 12 in FIG. 1 have been illustrated, it will be understood that the memory 10 could include an odd number of memory locations. In this situation, in an exemplary embodiment, the hardware architecture may be the same as illustrated in FIG. 1 except that an additional second operational stage 22 is added. This new, final second operational stage 22 multiplies the output from the mod unit 26 in the previous second operation stage 22 with the value stored in the memory location 12 corresponding to the most significant bit of the index value i, and takes the mod p of the resulting product to produce the pseudo random number.

Furthermore, if the critical path of the fully compressed S(i) calculation is too long, then portions of the operational stage structure of FIG. 1 can be replaced with more constants. For example, the first multiplier in the operational stage structure uses S(1) and S(2) to calculate four values, 1, S(1), S(2) and S(1)*S(2). Therefore, this portion of the hardware architecture of FIG. 1 could be replaced with (1) a table storing those values and (2) a 4-input multiplexer selecting the appropriate table entry for output. Thus, the present invention permits the pseudo random number generator designer the flexibility of making a tradeoff between (1) storing just the binary components and using modulo multipliers to compute the sum, which results in some amount of calculation delay, and (2) using additional memory to store values for additional possible binary component combinations, which reduces the amount of overall delay in obtaining a final pseudo random number result. Regardless of the designer's preferred strategy, the present invention provides a methodology and architecture for generating pseudo random numbers that greatly reduces the amount of required memory.

Populating a Memory with the Binary Components

By reducing the amount of memory required, the present invention also reduces the initial setup of that memory because fewer memory locations are being filled. The memory locations 12 can be filled according to any well-known methodology and using any well-known architecture to implement the methodology. In a further exemplary embodiment of the present invention, a methodology and architecture are provided to populate the memory 10 with the binary components and still further reduce the initial setup of the memory 10.

Consider the calculation for the binary component S($2^n$). As shown in the decomposition of this calculation given in expression (4) below, the inventor has recognized the application of an expression of S($2^n$) in terms of S($2^{n-1}$)

$$S(2^n) = v^{2^n} \bmod p \quad (4)$$

$$= v^{2^{n-1}} * v^{2^{n-1}} \bmod p$$

$$= \left(v^{2^{n-1}} \bmod p * v^{2^{n-1}} \bmod p\right) \bmod p$$

$$= (S(2^{n-1}) * S(2^{n-1})) \bmod p$$

Hence each binary component S($2^n$) can be iteratively and quickly calculated for n>1.

Figure 2:
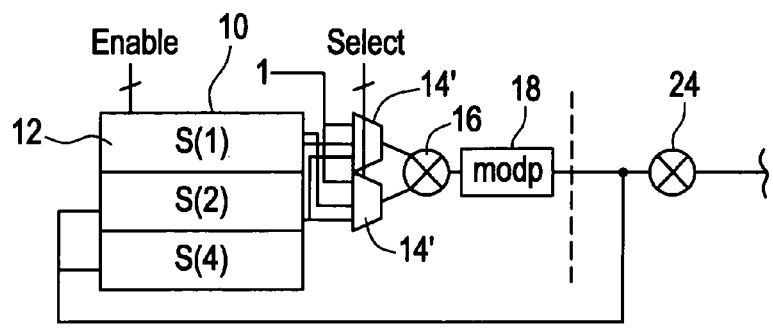
FIG. 2 illustrates a hardware architecture for populating the memory of FIG. 1 according to an embodiment of the present invention.

FIG. 2 illustrates a portion of the hardware architecture of FIG. 1 modified to accomplish setup of the memory locations 12 according to this further exemplary embodiment of the present invention. As shown, the two input multiplexers 14 of FIG. 1 have been replaced with three input multiplexers 14'. A multiplexer 14' receives the value '1' and the value stored in the associated memory location 12 as did the multiplexers 14. However, the multiplexer 14' also receives the value stored in the memory location 12 that is associated with the multiplexer 14' having an output sent to the same multiplier 16. Namely, the multiplexer 14' for the S(1) memory location 12 receives the values stored in the S(1) and S(2) memory locations 12, the multiplexer for the S(2) memory location receives the values stored in the S(1) and S(2) memory locations 12, the multiplexer 14' for the S(4) memory location 12 receives the values stored in the S(4) and S(8) memory locations, the multiplexer 14' for the S(8) memory location 12 receives the values stored in the S(4) and S(8) memory locations 12, etc.

Furthermore, as shown in FIG. 2, the output of each mod unit 18 is connected to the higher order memory location 12 of the two memory locations 12 associated with the mod unit 18 as well as the memory location 12 for the next higher order binary component. For example, the output of the mod unit 18 associated with the S(1) and S(2) memory locations 12 is connected to the S(2) memory location 12 and the S(4) memory location 12; the output of the mod unit 18 associated with the S(4) and S(8) memory locations 12 is connected to the S(8) memory location 12 and the S(16) memory location 12, etc. As will be appreciated, the final mod unit 18 is only connected to the higher order memory location 12 of the two memory locations 12 associated with the final mod unit 18 when an even number of memory locations 12 are used.

As is well-known, storing a value in a memory location 12 of a memory 10 requires enabling that memory location 12. Accordingly, when a mod unit 18 generates a value, the appropriate memory location 12 has been enabled to store the generated value.

Accordingly, to populate the memory 10, the S(1) memory location 12 is filled in the conventional manner with the value v since v<p. Then, the multiplexers 14' and the memory locations 12 are enabled such that each S($2^n$) memory location 12 is filled using the value stored in the S($2^{n-1}$) memory location 12. For example, to fill the S(2) memory location 12, the two multiplexers 14' receiving the values stored in the S(1) and S(2) memory locations 12 are enable to select the S(1) memory location 12. As a result the mod unit 18 associated with these two multiplexers 14' will generate the S(2) value, which is supplied to both the S(2) and S(4) memory locations 12. By having enabled the S(2) memory location 12, the S(2) value is stored in the S(2) memory location 12. To fill the S(4) memory location 12, the same multiplexers 14' are enable to select the S(2) memory location 12 such that the mod unit 18 associated with these two multiplexers 14' generates the S(4) value, which is supplied to both the S(2) and S(4) memory locations. This time, the S(4) memory location 12 has been enabled to store the S(4) value. This process may be repeated until the memory locations 12 are filled with the appropriate binary component—the entire setup can be done in as little as n−1 cycles.

By re-using the components in the hardware architecture of FIG. 1, the architecture of FIG. 2 prevents a resource conflict between populating the memory locations 12 and generating the pseudo random number.

Mod Operation Hardware

The mod units 18 and 26 in the above-described exemplary embodiment operate according to any well-known methodology and have any well-known structure for implementing such a methodology. In one exemplary embodiment of the present invention, the mod units 18 and 26 employ the methodology discussed in detail below.

Consider equation (5) below which shows that the mod of a number can be broken down into a summation of mod operations onto the individual components that make up the number. In this case, equation (5), breaks up the dividend into its binary components and computes the mod of each power of two number. The individual results are summed together, and then a final mod operation is performed.

$$\left[\sum_{i=0}^{x-1} y_i 2^i\right] \bmod (p) = \left[\sum_{i=0}^{x-1} y_i \left[2^i \bmod (p)\right]\right] \bmod (p) \quad (5)$$

$$y_i \in \{0, 1\}$$

Figure 3:
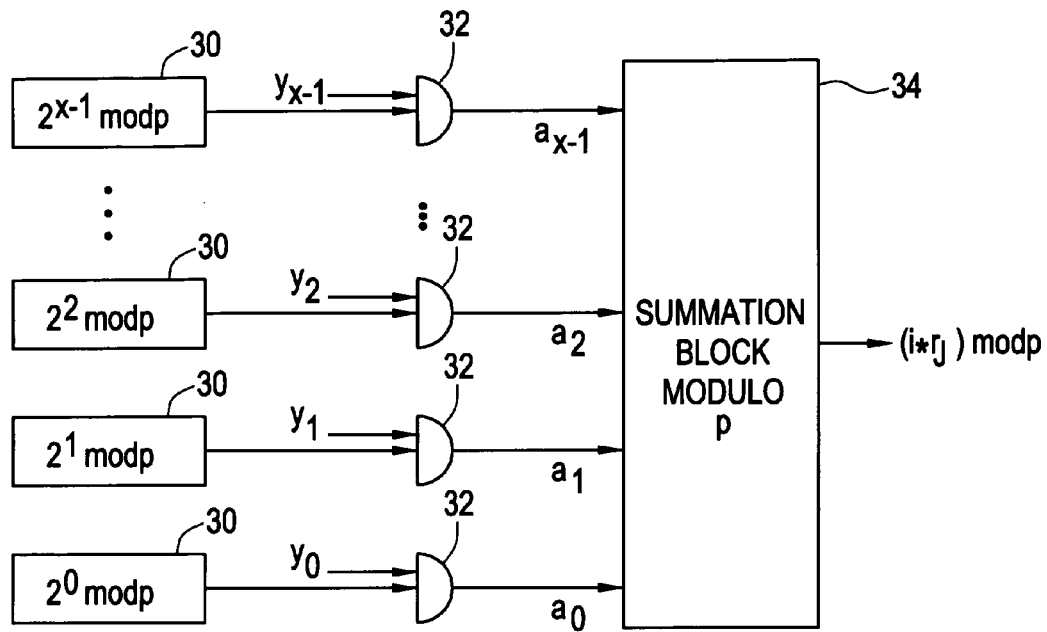
FIG. 3 illustrates an architecture for the mod unit of FIG. 1.

FIG. 3 shows an exemplary architecture for implementing the mod decomposition of equation (5). As shown, the power of two mod calculations are pre-computed and stored into registers or memory locations 30. The binary product y represents the dividend of the mod operation; namely, the output of multipliers 16 or 24. Each binary component (i.e., bit) is input along with a corresponding power of two mod value by an AND gate 32. For example, the least significant binary component y0 and the zeroth order power of two mod value are input by one of the AND gates 32, the next significant binary component y1 and the first order power of two mod value are input by the next AND gate 32, etc. The AND gates 32 logically AND the inputs to generate intermediate mod values $a_0, a_1, \ldots a_{x-1}$, which are passed to a modulo summation block 34.

Figure 4:
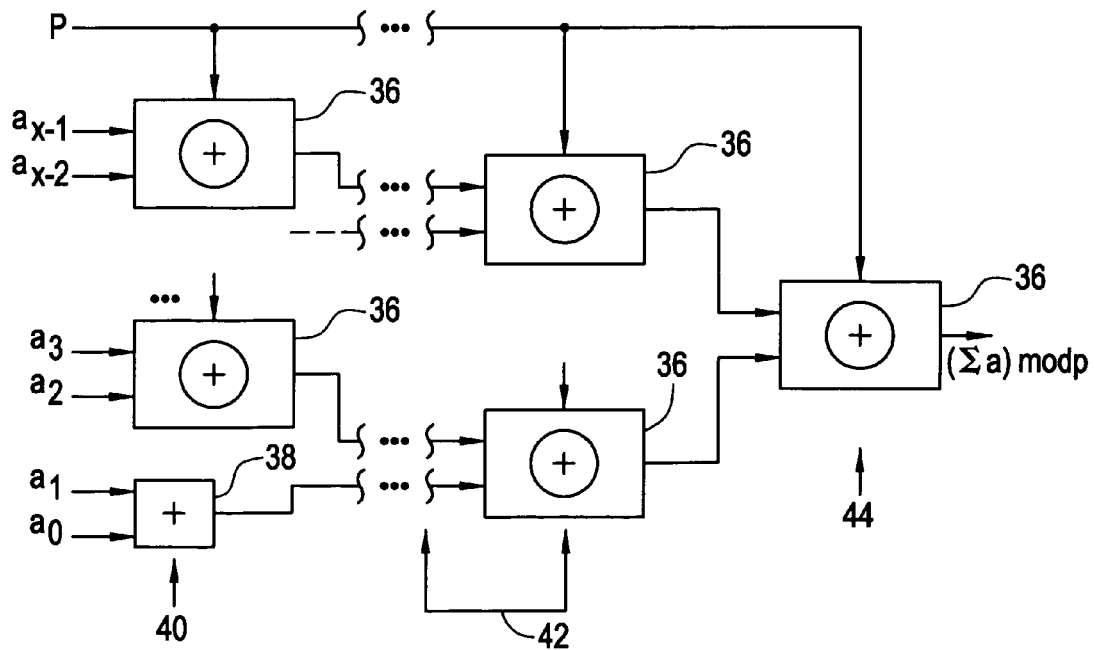
FIG. 4 illustrates the summation block of FIG. 3 in greater detail.

FIG. 4 illustrates the modulo summation block 34 in greater detail. As shown, the modulo summation block 34 has a tree structure to minimize the propagation delay. Namely, the modulo summation block 34 has a base level 40, a number of intermediate levels 42 and a final level 44. Each level includes one or more modulo adders 36. Each modulo adder adds two input numbers together and generates the mod p result of the sum. Accordingly, the base level 40 includes a modulo adder 36 for every two intermediate mod values a, the intermediate levels 42 include a modulo adder 36 for every two modulo adders 36 in the previous level, and the final level 44 includes a single modulo adder 36. As will be appreciated, the number of intermediate levels 42 may be a number necessary to generate two outputs to the final level 44. Depending on the value of p, one or more of the modulo adders 36 can be replaced by an adder 38. For the purposes of example only, FIG. 4 illustrates the situation where p=6. Therefore, the first two intermediate mod values from FIG. 3 are at most 1 and 2 regardless of p (i.e., 1 MOD 6=1, 2 MOD 6=2) so a simple adder 38 can be used in place of a modulo adder 36 because the value is guaranteed to be in modulo p arithmetic.

Figure 5:
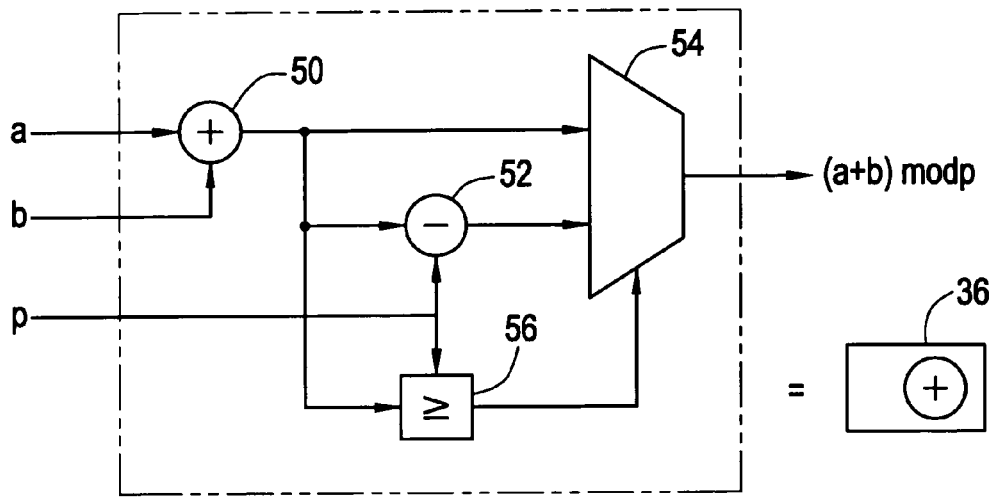
FIG. 5 illustrates the modulo adder of FIG. 4 in greater detail.

As discussed above, the modulo adders 36 perform two functions. First, they add the two input numbers together. Second, they check the sum and determines if the sum lies outside of the mod field. If so, the output value is wrapped around relative to the mod field. FIG. 5 illustrates an embodiment of a modulo adder 36. As shown, the modulo adder 36 includes an adder 50 adding inputs a and b, and a subtractor 52 subtracting the mod operand (e.g., p) from the sum of a+b. A selector 54 selectively outputs one of a+b and (a+b)−(p). A comparator 56 compares the value (p) to the sum a+b, and controls the selector 54 to output the sum a+b if the sum a+b is less than or equal to the value (p).

Otherwise, the comparator 56 instructs the selector 54 to select the output of the subtractor 52.

Populating Memory Locations with $2^n$ mod p Components

The memory locations 30 can be filled according to any well-known methodology and using any well-known architecture to implement the methodology. In a further exemplary embodiment of the present invention, a methodology and architecture are provided to populate the memory locations 30 with the $2^n$ mod p values. This is accomplished in an iterative manner similar to the set-up of the $S(2^n)$ values described in detail above. Of course in the overall timeline, the $2^n$ mod p values need to be set up before the mod units 18 are used in the computation of the $S(2^n)$ values. Consider the calculation for the $2^n$ mod p values. As shown in the decomposition of this calculation given in expressions (6) below, the inventor has recognized an application of an expression of $2^n$ mod p in terms of $2^{n-1}$ mod p.

$$2^n \bmod p = (2^{n-1} * 2) \bmod p \quad (6)$$
$$= (2^{n-1} \bmod p * 2 \bmod p) \bmod p$$
$$= (2^{n-1} \bmod p * 2) \bmod p$$

Note that expression (6) is valid only for n>1. For n=1, $2^n$ mod p=1, since p>2. As shown from the decomposition above in expression (6), $2^n$ mod p can be calculated using a shift on $2^{n-1}$ mod p and selecting the mod. Since the shift on $2^{n-1}$ mod p will keep the input to the mod in the modulo p range, a simple subtract and sign comparison can be used to get the result.

Figure 6:
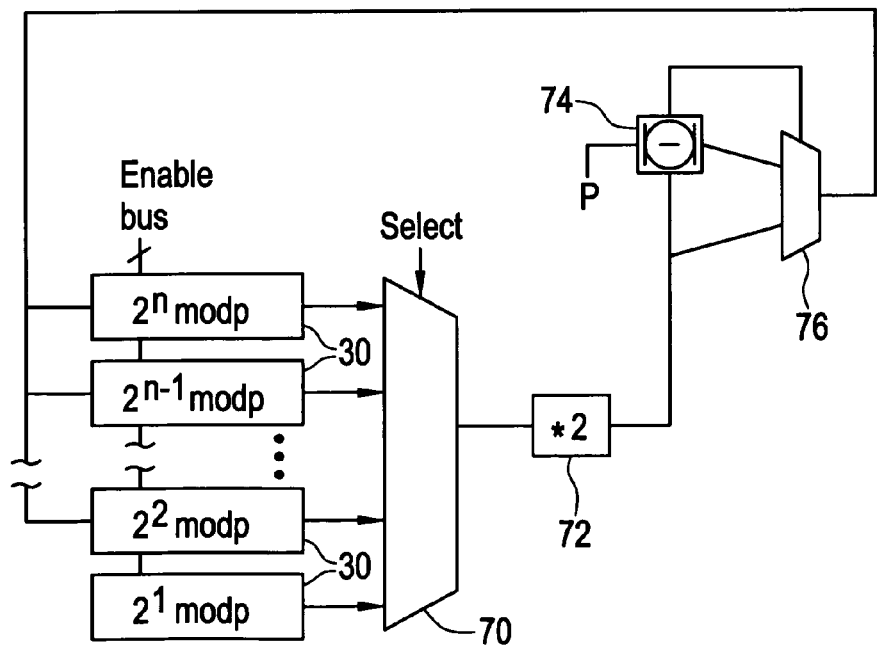
FIG. 6 illustrates a hardware architecture according to an embodiment of the present invention for populating the memory of FIG. 4.

FIG. 6 illustrates an exemplary hardware architecture according to the present invention for implementing this methodology. As shown, a bus multiplexer or selector 70 is connected to the $2^1$ mod p to $2^{n-1}$ mod p memory locations 30. A multiplier 72 receives the output of the multiplexer 70 and multiplies the output thereof by 2, which is a shift left in binary representation.

A subtractor 74 subtracts the output of the multiplier 72 from p and outputs the result and an sign indicator, which indicates a sign of the result, to a multiplexer 76. The multiplexer 76 selectively outputs one of the output from the subtractor 74 and the output from the multiplier 72 using the sign indicator as a control signal.

Next the operation of this architecture will be described in more detail. First, it should be noted that the register 30 holding $2^0$ mod p is preset to a value of 1 and the register holding $2^1$ mod p is preset to a value of 2, since 2 is less than p for the target applications.

To fill the $2^2$ mod p register 30, the $2^1$ mod p value is selected and output from the bus multiplexer 70 in response to an applied select signal. This value is then shifted by the multiplier 72 and subtracted from p by the subtractor 74. The sign of the subtraction allows either $2^1$ mod p*2 or |p−$2^1$ mod p*2| to go through the multiplexer 76 to become the value for the $2^2$ mod p register 30. Namely, if p−$2^1$ mod p*2 is greater than or equal to zero, then |$2^1$ mod p*2| is output by the multiplexer 76. But if p−$2^1$ mod p*2 is less than zero, then p−$2^1$ mod p*2 is output by the multiplexer 76. The register 30 for the $2^2$ mod p is enabled by an enable signal for the registers 30 so that the register 30 stores the output of the multiplexer 76 as the $2^2$ mod p value.

This operation then repeats, wherein the next $2^n$ mod p register 30 is enabled and the $2^{n-1}$ mod p value is output through the bus multiplexer 70. In this way, it takes n−2 cycles to set-up all of the registers 30.

CONCLUSION

The method and hardware architecture embodiments of the present invention enabling the calculation of pseudo-random sequences on-the-fly is extremely efficient. The present invention precludes the need for any derived tables or registers to be externally programmed, since all of the hardware may be self-setting, and hence the only input needed to the entire architecture at set-up are the quasi-static values p and v.

The hardware takes advantage of modular arithmetic reductions and splits the computation into binary components for both the S(i) and internal mod computations, creating tree structures to enable the most efficient fast calculations on-the-fly.

The invention enables the creation of pseudo-random sequences with good characteristics to be implemented in hardware and with minimal latency needed for setting up the hardware due to an efficient self-set-up scheme.

The invention may be applicable to numerous arts such as cryptography, encoding, etc. For example, in applying the present invention to RSA encryption, p may be the product of two prime numbers P and Q, v may be the message number, and i may be a published exponent in the context of the RSA encryption algorithm. Or, in applying the present invention to RSA encryption, p may be the product of two prime numbers P and Q, v may be the cipher text, and i may be the inverse modulo of the encryption exponent and (P−1)(Q−1) in the context of RSA encryption. While some examples of applying the present invention to RSA encryption have been provided, it will be understood the that present invention is not limited in application to RSA encryption. Instead, the present invention finds applicability in any encryption algorithm using pseudo random number generation.

Turning to encoding applications, in the context of UMTS turbo interleaver address generation, p may be a prime number, v may be an associated primitive root and $S(i) = v^i$ mod p may be used to generate the turbo interleaver address given the index i. In this application, the method according to the present invention would eliminate the need for an S(i) memory in conventional turbo interleaver address generators. While an example of applying the present invention in an encoding context has been provided, it will be understood that the present invention in not limited in application to turbo interleaver address generation. Instead, the present invention finds applicability in any encryption algorithm using pseudo random number address generation.

Furthermore, the applicability of the present invention is not limited to encryption and encoding, but instead, finds applicability to any art involving pseudo random number generation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method, comprising:
   generating a pseudo random number based on a set of stored pseudo random numbers, the stored pseudo random numbers corresponding with pseudo random numbers generated from a pseudo random number generation function indexed by orders of two.

2. The method of claim 1, further comprising:
storing N pseudo random numbers, each of the stored N pseudo random numbers equals a pseudo random number generated from a pseudo random number generation function S(i), where i is the index of the pseudo random number generation function, and the stored N pseudo random numbers equal pseudo random numbers generated using indices i=2^n, where n=0 ... N−1.

3. The method of claim 2, wherein the storing step stores each of the N pseudo random numbers in a memory location.

4. The method of claim 2, wherein the pseudo random number generation function S(i) equals v^i mod p, where v is a number less than p.

5. The method of claim 4, further comprising:
generating a turbo interleaver address using the generated pseudo random number.

6. The method of claim 4, wherein v is cipher text for encryption.

7. The method of claim 2, wherein the generating step generates the pseudo random number based on the stored N pseudo random numbers and a binary index having N bits.

8. The method of claim 7, wherein the generating step comprises:
selecting pseudo random number from the stored pseudo random numbers based on the binary index;
multiplying pseudo random numbers selected from the stored pseudo random numbers; and
performing a mod operation on a result of the multiplying step.

9. The method of claim 1, wherein the generating step comprises:
multiplying pseudo random numbers selected from the stored pseudo random numbers; and
performing a mod p operation on a result of the multiplying step.

10. The method of claim 9, wherein the generating step further comprises:
selecting the pseudo random numbers based on an index.

11. The method of claim 9, wherein the performing step performs the mod p operation by selectively combining $2^i$ mod p values for i=0 to x−1, where x is greater than one.

12. The method of claim 11, further comprising:
generating a $2^n$ mod p value based on a previously generated $2^{n-1}$ mod p value, where n is greater than 1.

13. A method of storing pseudo random numbers indexed by orders of a first number in a memory, comprising:
generating pseudo random numbers corresponding with pseudo random numbers generated using the pseudo random number generation function indexed by orders of a first number based on a stored pseudo random number; and
storing the generated pseudo random numbers.

14. The method of claim 13, wherein the generating step generates each successive pseudo random number, which is equal to a pseudo random number generated using the pseudo random number function indexed by a successive order of the first number, using the previously generated pseudo random number.

15. The method of claim 13, wherein the pseudo random number generation function S(i) equals v^i mod p, v is a number less than p.

16. The method of claim 15, wherein the generating step generates each successive pseudo random number, which is equal to a pseudo random number generated using the pseudo random number function indexed by a successive order of the first number, by squaring the previously generated pseudo random number and performing a mod p operation on a result of the squaring step.

17. The method of claim 15, wherein the first number is two.

18. A method of populating a memory with $2^n$ mod p values, comprising:
generating a $2^n$ mod p value based on a previously generated $2^{n-1}$ mod p value, where n is greater than 1; and
storing the generated $2^n$ mod p value.

19. An apparatus, comprising:
a memory storing pseudo random numbers equal to pseudo random numbers generated from a pseudo random number generation function indexed by orders of two; and
a selective combiner circuit generating a pseudo random number based on the stored pseudo random numbers.

20. An apparatus for populating a memory storing pseudo random numbers indexed by orders of a first number, comprising:
a memory storing a first pseudo random number equal to a pseudo random number generated from a pseudo random number generation function indexed by the first number; and
a generator circuit generating pseudo random numbers equal to pseudo random numbers generated using the pseudo random number generation function indexed by orders of the first number based on the stored first pseudo random number, and storing the generated pseudo random numbers in the memory.

* * * * *